United States Patent
Abramov et al.

(10) Patent No.: US 8,245,540 B2
(45) Date of Patent: Aug. 21, 2012

(54) METHOD FOR SCORING A SHEET OF BRITTLE MATERIAL

(75) Inventors: Anatoli Anatolyevich Abramov, Painted Post, NY (US); Nicholas Dominic Cavallaro, III, Corning, NY (US); Marvin William Kemmerer, Montour Falls, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 448 days.

(21) Appl. No.: 12/391,565

(22) Filed: Feb. 24, 2009

(65) Prior Publication Data
US 2010/0212361 A1    Aug. 26, 2010

(51) Int. Cl.
*C03B 33/09* (2006.01)
*C03B 33/00* (2006.01)

(52) U.S. Cl. .. 65/105; 65/112; 219/121.67; 219/121.72; 83/879; 83/880

(58) Field of Classification Search ............ 65/103, 65/105, 112; 219/121.6, 121.67, 121.72, 219/121.61; 225/1–5; 83/879, 880
See application file for complete search history.

(56) References Cited

U.S. PATENT DOCUMENTS

| | | | | |
|---|---|---|---|---|
| 5,132,505 | A * | 7/1992 | Zonneveld et al. | 219/121.6 |
| 5,776,220 | A | 7/1998 | Allaire et al. | 65/112 |
| 5,968,382 | A * | 10/1999 | Matsumoto et al. | 219/121.72 |
| 5,984,159 | A * | 11/1999 | Ostendarp et al. | 225/93.5 |
| 6,107,598 | A * | 8/2000 | Updegrove et al. | 219/121.7 |
| 6,112,967 | A * | 9/2000 | Ostendarp et al. | 225/93.5 |
| 6,211,488 | B1 * | 4/2001 | Hoekstra et al. | 219/121.72 |
| 6,252,197 | B1 * | 6/2001 | Hoekstra et al. | 219/121.84 |
| 6,259,058 | B1 * | 7/2001 | Hoekstra | 219/121.75 |
| 6,420,678 | B1 * | 7/2002 | Hoekstra | 219/121.75 |
| 6,800,831 | B1 | 10/2004 | Hoetzel | 219/121.72 |
| 2007/0151962 | A1 | 7/2007 | Doll et al. | 219/121.72 |

* cited by examiner

*Primary Examiner* — Jason L. Lazorcik
(74) *Attorney, Agent, or Firm* — Kevin M. Able

(57) ABSTRACT

A method of cutting glass that prevents uncontrolled crack propagation when high background stress is present, either in the form of thermal residual stress, external mechanical stress or a combination thereof. The method includes masking an edge of the glass by blocking the beam using highly reflective or absorptive material located near the glass surface, or deposited on the surface in a form of a thin film (or highly reflective paint) to prevent uncontrolled crack initiation and propagation starting from the glass edge. The initiation of the laser scoring is located at a predetermined distance from the glass edge. Yet another aspect of the invention embodies stopping propagation of the vent at the exiting end of the score line.

17 Claims, 3 Drawing Sheets

METHOD FOR SCORING A SHEET OF BRITTLE MATERIAL

BACKGROUND OF THE INVENTION

1. Field of the Invention

This invention is directed to a method of scoring a sheet of brittle material, and in particular, a method for scoring a glass sheet that minimizes uncontrolled crack propagation.

2. Technical Background

Mechanical tools are conventionally used for glass scoring. Alternatively, a laser beam, such as a $CO_2$ laser beam at a wavelength of 10.6 µm, may be used. Typically, the glass is rapidly cooled immediately after heating by the laser to create transient tensile stress in the glass via thermal shock.

During laser scoring, a median crack (i.e. partial vent) is created that extends into the body of the glass. To create the vent, a small initial flaw is formed on the glass edge. The initial flaw may then be transformed into the vent and propagated by the laser beam. The initial flaw can be made by different methods. For example, the flaw may be introduced by a laser pulse or by a mechanical tool such as a scribe, scoring wheel, indenter, etc.

Heating of the glass with a laser beam creates a thermal gradient and a corresponding stress field that is responsible for the formation and propagation of the vent. If the heated glass is quickly quenched with a coolant the induced thermal stresses can be increased even further. However, propagation of the vent can be affected by the background stress in the glass (e.g. internal stress and stress that may be applied to the glass sheet from handling or holding the sheet during the scoring process). The background stress may become a significant factor when laser scoring is performed on just-formed glass as it cools, for example a sheet of glass immediately after it has been drawn from a molten mass. This may especially be the case during the removal of bulbous edges of the sheet (beads) that may have formed during the drawing of the sheet. The internal stress in the glass may be caused, for example, by differences in glass thickness produced during the forming process, and consequently by non-uniform glass cooling and a subsequent stress build-up concentrated in the beaded edge area. Additionally, stress can be applied to the glass by deformation (bending, twisting) of the sheet during glass handling by grippers or (and) suction cups used to handle the glass. If the background stress is high enough, it may cause uncontrolled propagation of the crack, which can start at the sheet edge where the initial flaw is located and deviate away from the desired scoring direction at the moment the laser beam reaches the sheet edge. More simply put, the thermal stress introduced by the laser beam can initiate a crack that propagates in an undesirable direction. Similarly, deviation of the vent from the prescribed score line can occur at the opposite end of the score, where the laser beam exits the opposing sheet edge.

SUMMARY

In one embodiment, a method of scoring a sheet of brittle material is disclosed, comprising forming a flaw in a surface of the sheet of brittle material at an initiation point located a predetermined distance from a first edge of the sheet of brittle material, impinging a beam of electromagnetic radiation on the flaw such that a vent crack is formed at the initiation point, traversing the beam of electromagnetic radiation to propagate the vent crack toward a second edge of the sheet of brittle material, and wherein the vent crack does not intersect the first edge during the traversing, and wherein the beam of electromagnetic radiation is prevented from impinging on the surface of the sheet of brittle material between the initiation point and the first edge by a mask positioned between a source of the electromagnetic radiation and the surface of the sheet of brittle material The sheet of brittle material may be, for example, a sheet of glass, a glass-ceramic or a ceramic material. In some cases, the second edge can be substantially parallel to the first edge. Some glass sheet forming operations can produce sheets wherein edge portions of the sheet are bulbous (beaded edge portions). The scoring of such sheets can be improved by applying the teachings disclosed herein.

Traversing the laser beam can include propagating the vent crack to a stop point located a predetermined distance from a second edge of the sheet of brittle material such that the vent crack does not propagate to the second edge during the traversing. For example, the beam of electromagnetic radiation can be prevented from impinging on the surface of the sheet of brittle material between the stop point and the second edge by masking the beam of electromagnetic radiation with a suitable mask. However, the vent crack can be prevented from propagating between the stop point and the second edge of the sheet of brittle material by reducing a power of the beam of electromagnetic radiation. To improve scoring further, a jet of coolant on the surface of the sheet of brittle material proximate the traversing beam of electromagnetic radiation that can increase the stress produced in the sheet.

Preferably, the distance between the initiation point and the first edge is selected to prevent the vent crack from intersecting the first edge during the traversing. For example, the distance between the initiation point and the first edge can be selected to be at least 1 mm, or even at least 3 mm. The distance between the first edge and the initiation point should be greater than the distance by which the mask extends over the surface of the sheet. In some cases, the initiation point can be selected to be about 0.5 mm farther from the first edge than the extension of the mask. Preferably, the mask is positioned a distance equal to or less than about 5 mm from the surface of the sheet of brittle material, such as between 0.5 and 5 mm from the surface of the sheet. However, the mask may also be placed in contact with the surface of the sheet of brittle material.

In another embodiment, a method of scoring a glass sheet is described comprising forming a flaw in a surface of the sheet of glass at an initiation point positioned a predetermined distance from a first edge of the sheet of brittle material, impinging a laser beam on the surface of the sheet of glass at the initiation point to form a vent crack, traversing the laser beam to propagate the vent crack toward a second edge and wherein the laser beam is prevented from impinging on the surface of the sheet of glass between the initiation point and the first edge by a first mask positioned between a source of the laser beam and the surface of the sheet of glass.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

Figure 1:
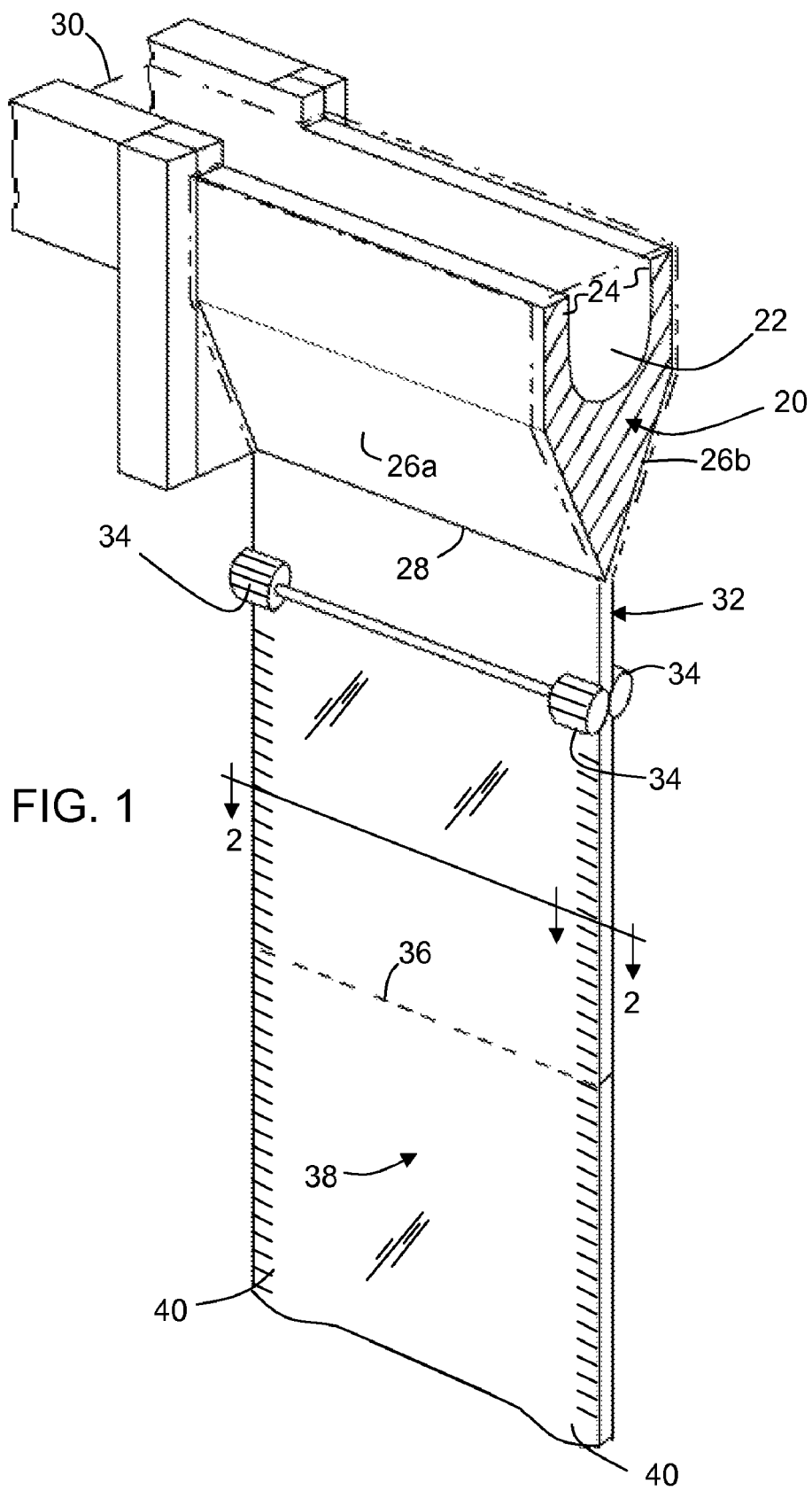
FIG. 1 is a perspective and partial cross sectional view of a forming body used in a fusion downdraw glass making process.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As used herein, the term "score line" is used to represent a desired or prescribed path for producing a score.

As used herein, the terms vent or vent crack are used to denote an elongate crack in a brittle material that opens to a surface of the material. The vent may or may not be perpendicular to the surface of the brittle material.

As used herein, a brittle material is a material that exhibits little or no plastic deformation before failure. The principal failure mode of a brittle material is fracture. Brittle materials include glass, glass-ceramics and ceramic materials.

The separation of a portion of a glass sheet from a large glass sheet is typically performed by first scoring the sheet. In a mechanical scoring method, the score is made using a mechanical contact tool, such as a diamond scribe, a carbide scribe or a scoring wheel. The resultant score provides a starting point for the propagation of a vent crack through the body of the glass.

In an exemplary laser scoring process, a laser is used to heat the glass along a prescribed score line to create thermal stress in the glass sufficient for a vent crack to form at the initial flaw. The laser beam is then traversed over the surface of the glass, and the vent crack follows the stress field produced by the traversing beam to produce a score.

Typically, after the score has been created, a stress is applied to the material along the score. For example, the glass sheet may be placed into a bending mode, where a tensile stress is applied to the sheet along the score. The stress is concentrated at the score (at the tip of the vent crack), and the vent crack is driven through the remaining thickness of the glass to separate the glass.

In reality, glass typically includes both permanent internal stresses that are frozen into the sheet during the manufacturing process, and transient stresses that may result, for example, from the way the sheet is supported during a particular scoring process. If these (background) stresses are high enough, a vent crack formed in the sheet will respond according to the internal stress fields in the sheet, making a score along a prescribed path (and subsequent sheet separation) difficult to obtain.

One method of making glass sheet is by a fusion downdraw process, so called because a glass flow is caused to separate into two separate streams of molten glass that flow over a forming body. The streams are then rejoined, or fused, at the bottom of the forming body to produce the glass sheet. This can be more clearly understood with the benefit of FIG. 1 illustrating an exemplary forming body that may be used in a fusion downdraw glass making process.

FIG. 1 depicts forming body 20 comprising a channel or trough 22 formed in an upper portion of the body framed by side walls 24, and converging forming surfaces 26a and 26b that meet at root 28 extending along a length of the forming body. Molten glass 30 is introduced into trough 22 and overflows side walls 24 on both sides of the forming body, creating two separate streams of molten glass that flow down and over the forming body. The two separate molten glass streams flow over converging forming surfaces 26a and 26b, and meet at root 28. The streams rejoin, or fuse, at the root to produce a single stream that flows downward from the root as pristine glass ribbon 32. The molten glass that has been in contact with the surfaces of the forming body (e.g. the converging forming surfaces) is disposed within the interior portion of the resultant ribbon, whereas the outer surfaces of the ribbon have not contacted the forming surfaces.

Figure 2:
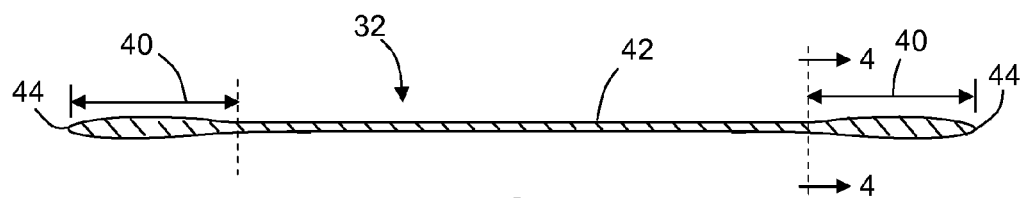
FIG. 2 is a cross sectional edge view of a glass sheet cut from the ribbon of glass formed by the forming body of FIG. 1.

Surface tension in the descending ribbon can cause the ribbon to attenuate across the width of the ribbon (the ribbon becomes narrower), and the edges of the ribbon increase in thickness and become bulbous (best seen with the aid of FIG. 2 showing a cross sectional edge view of the ribbon across a width of the ribbon). Rollers 34 grip the ribbon at the bulbous edge portions (or "beads") 40 and draw the ribbon downward. Other rollers (not shown) help control the width of the ribbon by creating a tension across the width of the ribbon that is counter to the inwardly directed surface tension. The ribbon is then scored (dashed line 36) at a location below the root and separated across the width of the ribbon to form individual glass sheet or pane 38.

Edge portions 40 of the separated glass sheet 38 in many cases are removed for at least several reasons. First, they do not conform to the overall thickness requirements that may be placed on the sheet by commercial considerations. Second, because the pulling rollers grip the sheet at the edges, the surfaces at the edges of the sheet are no longer pristine and generally unusable for most applications.

Because the beaded edge portions of the sheet are thicker than interior portion 42 of the sheet, cooling of the edge portions takes place at a different rate than the interior portion. In short, a temperature gradient is created across the width of the sheet that is greatest proximate the side edges 44 of the sheet, and wherein this temperature gradient can induce stress into the glass as the glass cools. Moreover, the pulling rollers may be toothed or fluted to provide greater gripping force on the glass, thus even the thickness of the beads may vary along the length of the glass sheet and also be responsible for internal stresses.

To complete the sheet forming process and produce a commercially saleable sheet, the beads can be removed by first scoring the sheet parallel to the beads along a prescribed score line, then applying a bending force to the sheet along the resultant score.

As described previously, the stresses that may exist in a glass sheet at the time the sheet is scored may make it difficult to control the propagation direction of the vent crack (that is, in a direction across the sheet) produced by the scoring. This problem can be particularly acute proximate edge portions 40 of the sheet.

Figure 3:
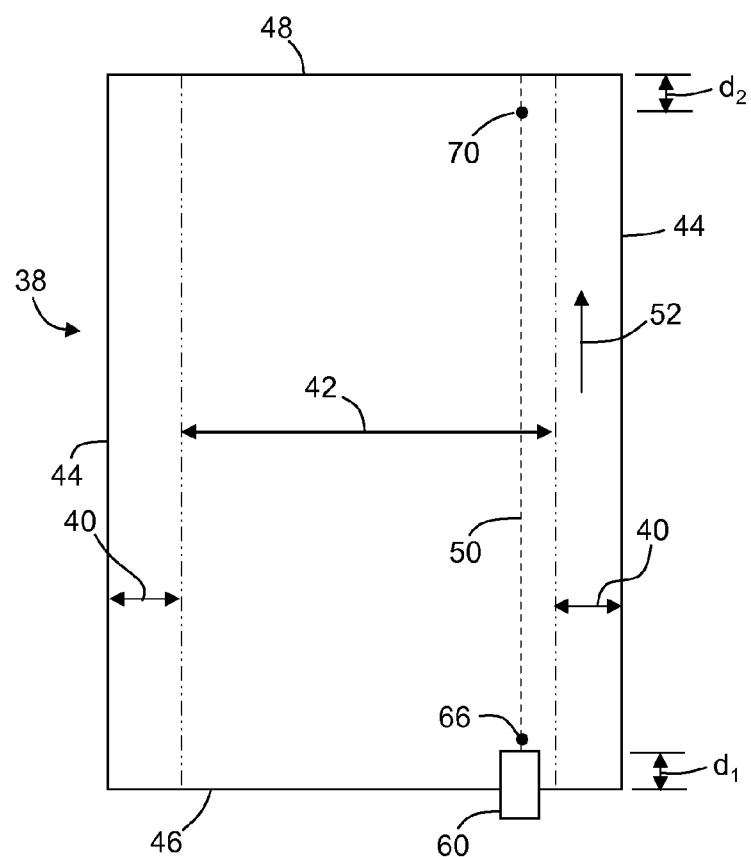
FIG. 3 is a front view of the glass sheet of FIG. 2 showing a mask masking a portion of the glass sheet from a first edge to an initiation point.

Accordingly, a method is described herein wherein loss of control of the developing vent (and deviation of the vent crack from the prescribed score line) is minimized or eliminated. Referring to FIG. 3, glass sheet 38 freshly removed from the draw (e.g. forming body 20) is shown. Glass sheet 38 comprises "quality" area 42 (the interior portion of the sheet that has not been contacted by the drawing apparatus, such as rollers 34, and at least a portion of which will eventually be used in a final product) and edge portion 40 terminating at side edge 44. Quality area 42 extends between edge portions 40. Glass sheet 38 further comprises edges 46 and 48 intersecting with side edge 44.

In the fusion sheet forming process described above, edges 46 and 48 represent the edges obtained when separating the sheet from the ribbon of glass drawn from the forming body. Dashed line 50 represents a prescribed score line that runs generally parallel to side edge 44 of glass sheet 38. Is should be noted that the following description is directed to the removal of one of the beaded edge portions 40 of glass sheet 38, but that the opposite edge portion may be removed in an identical manner.

Figure 4:
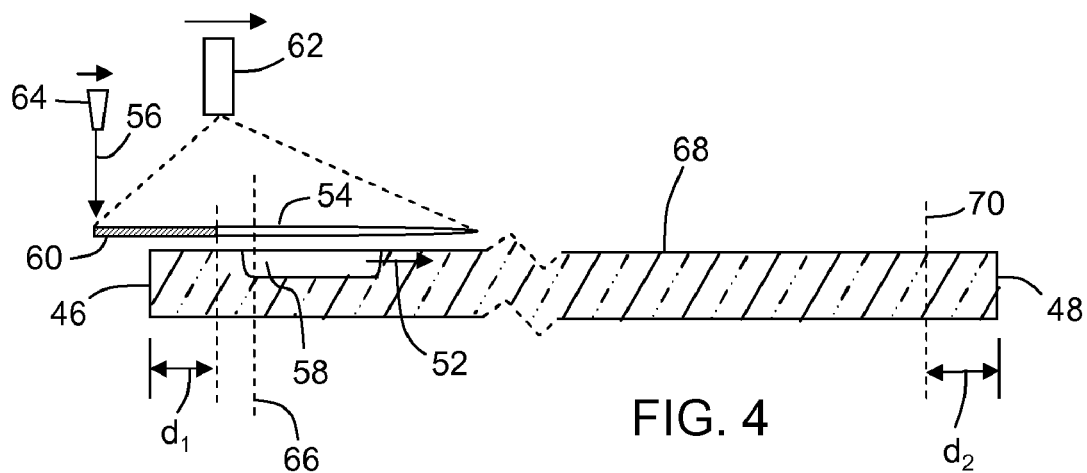
FIG. 4 is a cross sectional view of the glass sheet of FIG. 1 shown along a score line illustrating the propagation of a vent crack initiated at the initiation point.

To remove edge portion 40, the glass sheet is scored along score line 50 in a direction indicated by arrow 52. Scoring is performed by traversing laser beam 54 (see FIG. 4) along score line 50 in direction 52. Laser beam 54 is preferably an elongated laser beam. The shape of the laser beam may be controlled, for example, by suitable optical elements (not shown). Optionally, cooling jet 56 traverses closely behind laser beam 54, also in direction 52. Cooling jet 56 may be any suitable cooling fluid, although typically water is used. The cooling jet creates high thermal stress in the portion of the glass heated by the laser beam impinging on the glass sheet, and has been found to aid in forming vent crack 58.

An initial flaw is created on the surface of the glass sheet inward from edge 46 of the sheet rather than at edge 46, as would conventionally be done, to prevent backward propagation of the vent from extending to the edge of the sheet. The initial flaw may be a knick or scratch made with a scribe, a wheel, or any other conventional method of creating a flaw in a glass surface. It should be noted that an elongated laser beam has been shown to be more effective in laser scoring of glass sheet, and traverse of the laser beam typically does not commence instantaneously, but must ramp up in speed. Thus, and particularly in a production environment, the scoring process is more efficient if the laser can be activated so as to produce a laser beam outside of the sheet (away from the sheet and the sheet edge) to allow sufficient time to ramp up the traverse speed of the laser before the glass is impinged by the laser beam.

In accordance with the present embodiment, mask 60 is positioned between the laser beam source 62 (laser 62) and glass sheet 38. Mask 60 extends over glass sheet 38 between edge 46 of the sheet and the location of the initial flaw, hereinafter initiation point 66. Mask 60 may be any suitable reflecting or absorbing material that substantially prevents the laser beam from impinging on the glass sheet for a substantial portion of the distance behind the initiation point (relative to the direction of laser beam 54). That is, the laser beam is prevented from impinging on the glass sheet between edge 46 and the end of mask 60 (the distance the mask extends over the glass sheet). The mask may be, for example, a sheet of stainless steel. Mask 60 may extend over the glass sheet a distance $d_1$ in the range from about 1 mm to about 3 mm from edge 46. The distance $d_1$ should be chosen such that a backward propagating vent crack does not intersect with edge 46 during traversing of the laser beam under a particular set of scoring conditions. By backward propagation what is meant is propagation of the vent crack in a direction generally opposite from the direction the laser bean is traversing. For example, if the laser beam is traversing toward edge 48, backward propagation of the vent crack would be toward edge 46. Conversely, a forward propagating vent crack is propagating generally in the direction of the traversing laser beam. For example, if the laser beam is traversing toward edge 48, a vent crack propagating toward edge 48 is a forward propagating vent crack.

As scoring conditions may change (for example, the temperature of the glass sheet, how the glass sheet is handled and/or positioned, etc.), the position of the initiation point may vary from one set of conditions to another. A typical backward propagation has been found, for example, to be between about 0.5 mm and 3.5 mm, so the initiation point should be selected accordingly. Initiation point 66 should be located a distance from edge 46 that is greater than distance $d_1$. Initiation point 66 can be, for example, approximately 0.5 mm more than $d_1$.

To minimize diffraction effects that would reduce the efficiency of the mask in blocking the laser beam, mask 60 is preferably positioned close to surface 68 of the glass sheet. For example, mask 60 is typically positioned a distance equal to or less than about 5 mm from surface 68 of glass sheet 38, such as, for example, about 0.5 mm In some embodiments, mask 60 may be disposed on surface 68 of glass sheet 38, such as by "painting" a masking material on the glass sheet. In some instances, a masking material may be attached to surface 68 using an adhesive.

Figure 5:
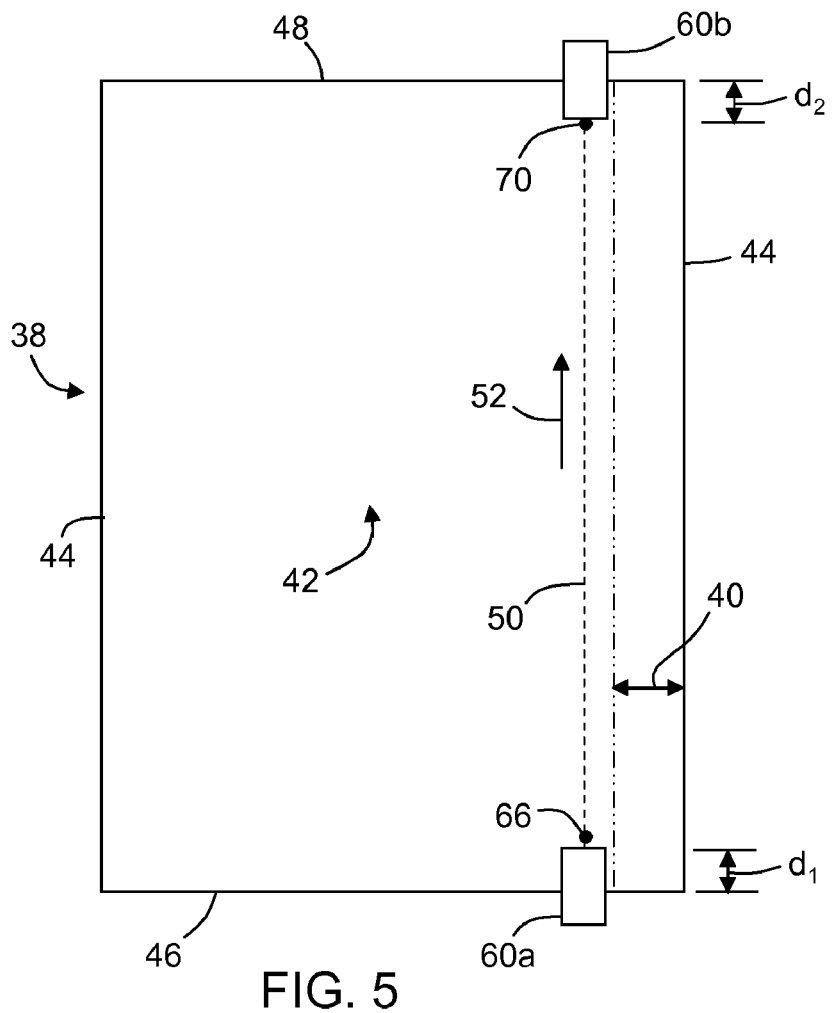
FIG. 5 is a front view of the glass sheet of FIG. 2 showing the use of two masks, one mask located proximate the initiation point and a second mask located proximate the stop point.

To ensure that the forward propagating vent crack does not deviate from score line 50 during the traversing of the laser beam, steps may be taken to prevent sufficient energy from the laser beam impinging on the glass sheet beyond a stop point 70 located a finite distance from second edge 48. That is, the traversing laser beam may be prevented from traversing further across the glass sheet by inserting a second mask between glass sheet 38 and laser 62, and between stop point 70 and second edge 48 of the glass sheet. Such an embodiment is shown in FIG. 5 depicting a first or start mask 60a and a second or stop mask 60b. Stop point 70 is typically located a distance $d_2$ between about 1 mm to 3 mm from second edge 48. Preferably, second mask 60b is located a distance from surface 68 of less than about 5 mm, and may, if desired, be affixed to the surface of the glass sheet.

Alternatively, the power of the laser beam may be reduced after traversing the stop point to prevent heating of the glass sheet that could lead to the vent crack deviating from the score line, or the cooling jet may be reduced or turned off at or before the stop point.

While the foregoing methods have been described in the context of a fusion downdraw glass sheet forming process, the methods disclosed herein may be applied generally to the scoring of sheets of brittle materials, such as glass, glass-ceramic or ceramic, that are under high stress without regard to the method of forming the sheet. Such high stress may result from temperature gradients, physical manipulations, thickness variations, or any other internally or externally derived or applied sources of stress. For example, according to the methods disclosed herein, the sheet may contain stresses produced by bending of the sheet. That is, the sheet may include a non-planar shape.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of scoring a sheet of brittle material, comprising:
   forming an initial flaw in a surface of the sheet of brittle material at an initiation point located a predetermined distance from a first edge of the sheet of brittle material wherein the initial flaw does not intersect the first edge of the sheet of brittle material; and then after forming the initial flaw,
   impinging a beam of electromagnetic radiation on the initial flaw such that a vent crack is formed at the initiation point;
   traversing the beam of electromagnetic radiation to propagate the vent crack toward a second edge of the sheet of brittle material, and wherein the predetermined distance between the initiation point and the first edge is selected to prevent the vent crack from intersecting the first edge during the traversing, and wherein the vent crack does not intersect the first edge during the traversing; and
   wherein the beam of electromagnetic radiation is prevented from impinging on the surface of the sheet of brittle material between the initiation point and the first edge by a mask extending over the glass sheet a distance d1 from the first edge, and positioned between a source of the electromagnetic radiation and the surface of the sheet of brittle material, further wherein the predetermined distance between the initiation point and the first edge is greater than the distance d1.

2. The method according to claim 1, wherein the sheet of brittle material is glass, glass-ceramic or ceramic.

3. The method according to claim 1, wherein the second edge is substantially parallel to the first edge.

4. The method according to claim 1, wherein the sheet of brittle material is a glass sheet comprising bulbous edge portions.

5. The method according to claim 1, wherein the traversing comprises propagating the vent crack to a stop point located a predetermined distance from a second edge of the sheet of brittle material such that the vent crack does not propagate to the second edge during the traversing.

6. The method according to claim 5, wherein the beam of electromagnetic radiation is prevented from impinging on the surface of the sheet of brittle material between the stop point and the second edge by masking the beam of electromagnetic radiation.

7. The method according to claim 5, wherein the vent crack is prevented from propagating between the stop point and the second edge of the sheet of brittle material by reducing a power of the beam of electromagnetic radiation.

8. The method according to claim 1, further comprising traversing a jet of coolant on the surface of the sheet of brittle material proximate the traversing beam of electromagnetic radiation.

9. The method according to claim 1, wherein the distance between the initiation point and the first edge is at least 1 mm.

10. The method according to claim 1, wherein the distance between the initiation point and the first edge is at least 3 mm.

11. The method according to claim 1, wherein the mask is positioned a distance equal to or less than about 5 mm from the surface of the sheet of brittle material.

12. The method according to claim 1, wherein the mask is in contact with the surface of the sheet of brittle material.

13. A method of scoring a glass sheet comprising:
    forming an initial flaw in a surface of the sheet of glass at an initiation point positioned a predetermined distance from a first edge of the sheet of brittle material wherein the initial flaw does not intersect the first edge of the sheet of brittle material; and then after forming the initial flaw,
    impinging a laser beam on the surface of the sheet of glass at the initiation point to form a vent crack;
    traversing the laser beam to propagate the vent crack toward a second edge, wherein the predetermined distance between the initiation point and the first edge is selected to prevent the vent crack from intersecting the first edge during the traversing, and wherein the vent crack does not intersect the first edge during the traversing; and
    wherein the laser beam is prevented from impinging on the surface of the sheet of glass between the initiation point and the first edge by a first mask extending over the glass sheet a distance d1 from the first edge, and positioned between a source of the laser beam and the surface of the sheet of glass, further wherein the predetermined distance between the initiation point and the first edge is greater than the distance d1.

14. The method according to claim 13, wherein the laser beam is prevented from impinging on the surface of the sheet of glass between the second edge and a stop point positioned a predetermined distance from the second edge by a second mask positioned between a source of the laser beam and the surface of the sheet of glass.

15. The method according to claim 13, wherein a power of the laser beam is reduced between the second edge and a stop point positioned a predetermined distance from the second edge, such that the vent crack does not intersect the second edge during the traversing.

16. The method according to claim 13, further comprising cooling the glass sheet proximate the impinging laser beam during the traversing.

17. The method according to claim 13, wherein the initiation point is at least about 1 mm from the first edge.

* * * * *